(12) United States Patent
Muller et al.

(10) Patent No.: US 8,978,391 B2
(45) Date of Patent: Mar. 17, 2015

(54) METHOD FOR GENERATING A THERMAL FLOW AND MAGNETOCALORIC THERMAL GENERATOR

(75) Inventors: Christian Muller, Strasbourg (FR); Jean-Claude Heitzler, Horbourg-Wihr (FR)

(73) Assignee: Cooltech Applications SAS, Holtzheim (FR)

( * ) Notice: Subject to any disclaimer, the term of this patent is extended or adjusted under 35 U.S.C. 154(b) by 179 days.

(21) Appl. No.: 13/643,154

(22) PCT Filed: Apr. 27, 2011

(86) PCT No.: PCT/FR2011/000255
§ 371 (c)(1),
(2), (4) Date: Oct. 24, 2012

(87) PCT Pub. No.: WO2011/135205
PCT Pub. Date: Nov. 3, 2011

(65) Prior Publication Data
US 2013/0042632 A1    Feb. 21, 2013

(30) Foreign Application Priority Data
Apr. 28, 2010 (FR) ..................... 10 53253

(51) Int. Cl.
*F25B 21/00* (2006.01)

(52) U.S. Cl.
CPC ........... *F25B 21/00* (2013.01); *F25B 2321/002* (2013.01); *Y02B 30/66* (2013.01)
USPC ........................ 62/3.1; 62/3.6; 62/3.7; 62/434

(58) Field of Classification Search
CPC .... F25B 21/00; F25B 2321/002; Y02B 30/66
USPC ............................ 62/3.1, 3.6, 3.7, 335, 434
See application file for complete search history.

(56) References Cited

U.S. PATENT DOCUMENTS

| | | | |
|---|---|---|---|
| 4,507,928 A | | 4/1985 | Johnson |
| 4,554,790 A | * | 11/1985 | Nakagome et al. .............. 62/3.1 |

(Continued)

FOREIGN PATENT DOCUMENTS

| | | |
|---|---|---|
| EP | 1 736 717 A1 | 12/2006 |
| FR | 2 922 999 A1 | 5/2009 |

(Continued)

OTHER PUBLICATIONS

International Search Report Corresponding to PCT/FR2011/000255.
(Continued)

*Primary Examiner* — Mohammad M Ali
(74) *Attorney, Agent, or Firm* — Davis & Bujold, PLLC; Michael J. Bujold (57) ABSTRACT

A method for generating a thermal flow from a thermal module comprising at least two magnetocaloric elements connected, two-by-two, through which a heat transfer fluid flows and is exposed to a magnetic field. The circulation exposes alternating elements of the magnetocaloric elements to an opposite variation in the magnetic field, and causes the transfer fluid to circulate simultaneously and in opposite directions in such a manner that the fluid flowing out of one of the magnetocaloric elements, at the end of a heating phase, is circulated, during the following phase, in the following magnetocaloric elements exposed to heating, while the fluid flowing out of one of the magnetocaloric elements, at the end of a cooling phase, is circulated in the following element exposed to cooling, and conversely. The heat transfer fluid is stored an intermediate receiving area. This invention also relates to a thermal generator implementing the method.

9 Claims, 5 Drawing Sheets

(56) References Cited

U.S. PATENT DOCUMENTS

| | | | |
|---|---|---|---|
| 5,091,361 A * | 2/1992 | Hed | 505/163 |
| 5,213,630 A | 5/1993 | Hashimoto | |
| 5,463,868 A * | 11/1995 | Peschka et al. | 62/6 |
| 6,588,216 B1 * | 7/2003 | Ghoshal | 62/3.1 |
| 6,595,004 B1 * | 7/2003 | Ghoshal | 62/3.1 |
| 7,076,959 B2 * | 7/2006 | Lewis | 62/3.1 |
| 8,037,692 B2 | 10/2011 | Muller et al. | |
| 2002/0053209 A1 * | 5/2002 | Zimm et al. | 62/3.1 |
| 2004/0093877 A1 * | 5/2004 | Wada et al. | 62/114 |
| 2004/0182086 A1 * | 9/2004 | Chiang et al. | 62/3.1 |
| 2004/0231338 A1 * | 11/2004 | Saito et al. | 62/3.1 |
| 2005/0000230 A1 * | 1/2005 | Saito et al. | 62/3.1 |
| 2007/0125095 A1 * | 6/2007 | Iwasaki et al. | 62/3.1 |
| 2007/0186560 A1 * | 8/2007 | Schauwecker et al. | 62/3.1 |
| 2009/0320499 A1 | 12/2009 | Muller et al. | |
| 2010/0236258 A1 | 9/2010 | Heitzler et al. | |

FOREIGN PATENT DOCUMENTS

| | | |
|---|---|---|
| WO | 2007/026062 A1 | 3/2007 |
| WO | 2008/012411 A1 | 1/2008 |

OTHER PUBLICATIONS

Written Opinion Corresponding to PCT/FR2011/000255.

* cited by examiner

METHOD FOR GENERATING A THERMAL FLOW AND MAGNETOCALORIC THERMAL GENERATOR

This application is a National Stage completion of PCT/FR2011/000255 filed Apr. 27, 2011, which claims priority from French patent application serial no. 10/53253 filed Apr. 28, 2010.

FIELD OF THE INVENTION

The present invention relates to a method for generating a thermal flow from at least one thermal module comprising at least two magnetocaloric elements associated and in fluidic communication two by two, through which a heat transfer fluid flows and which are exposed to a variable magnetic field creating alternately in each magnetocaloric element a different magnetic phase corresponding successively to a heating and a cooling phase, the heat transfer fluid circulating simultaneously through said magnetocaloric elements in a manner synchronized with the variation of the magnetic field.

It also relates to a thermal generator for the implementation of said method, comprising at least one thermal module including at least two associated magnetocaloric elements in fluidic communication with each other and arranged so that a heat transfer fluid flows through them, a magnetic arrangement intended for exposing each magnetocaloric element to a variable magnetic field, creating alternately in each magnetocaloric element two successive magnetic phases corresponding to a heating phase and to a cooling phase, the circulation of the heat transfer fluid through said magnetocaloric elements being achieved by circulating means synchronized with the variation of the magnetic field.

BACKGROUND OF THE INVENTION

Magnetic refrigeration technology at ambient temperature has been known for more than twenty years and the advantages it provides in terms of ecology and sustainable development are widely acknowledged. Its limits in terms of its useful calorific output and its efficiency are also well known. Consequently, all the research undertaken in this field tends to improve the performances of such a generator, by adjusting the various parameters, such as the magnetization power, the performances of the magnetocaloric element, the heat exchange surface between the heat transfer fluid and the magnetocaloric elements, the performances of the heat exchangers, etc.

The choice of the magnetocaloric materials is determining and influences directly the performances of a magnetocaloric thermal generator. To increase these performances, a solution consists in associating several magnetocaloric materials having different Curie temperatures in order to increase the temperature gradient between the ends of this assembly.

Figure 1A:
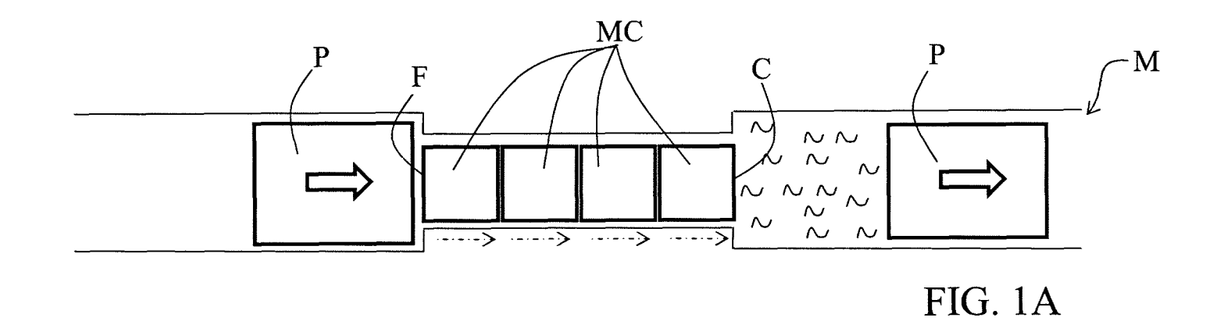
FIGS. 1A and 1B are schematic views of a thermal module of the prior art.
Figure 1B:
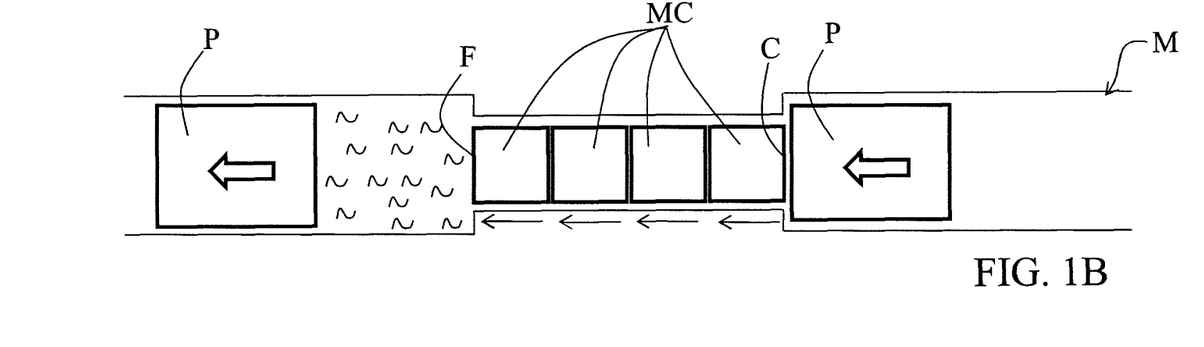

Thermal generators are thus known, which comprise at least one thermal module M such as the one represented on FIGS. 1A and 1B and comprising magnetocaloric materials MC arranged side by side and aligned, and circulating means for the heat transfer fluid such as pistons P, intended for giving the heat transfer fluid a reciprocating movement so as to pass through the set of magnetocaloric materials MC, to either side of the latter, between the cold side F and the hot side C of magnetocaloric materials assembly MC, and synchronized with the variation of a (not represented) magnetic field. As shown on FIGS. 1A and 1B, these pistons P are arranged on both sides of magnetocaloric materials assembly MC and move alternately in one direction and in the other, FIGS. 1A and 1B representing the pistons in their two extreme positions.

It appears in FIGS. 1A and 1B that the fluid moves either in one direction, towards hot end C (the direction of movement of the heat transfer fluid is shown by the dotted arrows, see FIG. 1A) when the magnetocaloric materials are exposed to a heating cycle, or in the other direction, towards cold end F (the direction of movement of the heat transfer fluid is shown by the solid arrows, see FIG. 1B) when the magnetocaloric materials are exposed to a cooling cycle.

This thermal module M has a disadvantage due to the fact that, in order to reach a temperature gradient, it is necessary to circulate a heat transfer fluid through all of the materials. The use of several magnetocaloric elements MC leads to an increase of the material length to be crossed by said heat transfer fluid. Thus, in order not to reduce the number of cycles (a cycle being defined by a heating and a cooling of the magnetocaloric element), it is necessary to increase the speed of the heat transfer fluid. Now, the increase of the speed leads to an increase of the pressure, which worsens the head losses and reduces the efficiency of the heat exchange between the heat transfer fluid and the magnetocaloric elements, and leads to a reduction of the thermal efficiency of the magnetocaloric generator.

It is also known that, in order to increase the thermal output of a magnetocaloric generator, a possibility consists in increasing the number of cycles per second. Now, this results in an increase of the speed, which also leads to the above-mentioned disadvantages.

A generator comprising a thermal module M such as illustrated in FIGS. 1A and 1B requires a non-negligible previous operating time in order to reach an exploitable temperature gradient between the two ends, because of the multiplicity of the materials used.

The applicant offered, in his not yet published patent application FR 08/05901, a magnetocaloric thermal generator allowing to improve the thermal efficiency of the known generators, with a same quantity or length of material.

It also offered, in patent applications WO 2007/026062 and WO 2008/012411, magnetocaloric thermal generators with a modular construction and comprising two distinct hot and cold circuits in contact with the magnetocaloric materials.

SUMMARY OF THE INVENTION

The present invention aims to overcome the above-mentioned disadvantages of the prior art and to offer, as a variant to the subject of its patent application FR 08/05901, a method for generating a thermal flow that can be easily implemented by a magnetocaloric thermal generator and having an improved thermal efficiency, which also allows reaching a higher temperature gradient between the hot and cold ends of said generator, and this faster, in order to increase its effectiveness for a same quantity or length of magnetocaloric material.

To that purpose, the invention relates to a process of the kind described in the preamble, characterized in that it furthermore consists in

- connecting said magnetocaloric elements two by two by means of two distinct fluidic circuits,
- exposing alternating elements of said magnetocaloric elements to an opposite variation of the magnetic field in order to create simultaneously opposite magnetic phases in each of them,
- circulating the heat transfer fluid in said magnetocaloric elements two by two simultaneously and in two opposite directions and so that, on the one hand, the volume of fluid flowing out of one of said magnetocaloric elements through one of said fluidic circuits at the end of a magnetic heating phase is made to circulate, during the following magnetic phase, in the following magnetocaloric element that is then undergoing a magnetic heating phase and that, on the other hand, the volume of fluid flowing out of one of said magnetocaloric elements through the other of said fluidic circuits at the end of a magnetic cooling phase is made to circulate, during the following magnetic phase, in the following magnetocaloric element that is then undergoing a magnetic cooling phase, and vice-versa, and, storing, between two magnetically opposite phases, the heat transfer fluid that flows out of one of said magnetocaloric elements in an intermediate receiving area.

The invention also relates to a thermal generator as described in the preamble, wherein said magnetocaloric elements are in fluidic communication two by two via two distinct fluidic circuits comprising each at least one compartment able to receive, during a magnetic phase, a defined volume of heat transfer fluid flowing out of one of said magnetocaloric elements and to direct it towards the following magnetocaloric element during the following magnetic phase.

The method according to the invention can in particular consist in circulating the heat transfer fluid simultaneously towards a first end of said thermal module, called cold end, through each magnetocaloric element undergoing a cooling phase, and towards the second end of said thermal module, called hot end, through each magnetocaloric element undergoing a heating phase.

It can furthermore, consist in connecting fluidically the magnetocaloric elements two by two through two distinct circuits, respectively a circuit of fluid that is cooling down, called cold circuit, and a circuit of fluid that is heating up, called hot circuit, said two circuits comprising each a compartment forming an intermediate receiving area, being located between two adjacent magnetocaloric elements, and arranged so as to receive the heat transfer fluid flowing out of a magnetocaloric element before reinjecting it in the following magnetocaloric element.

To increase the temperature range of its implementation (for example between −25° C. and +65° C.), the method according to the invention can consist in arranging in said thermal module magnetocaloric elements having each a different Curie temperature, according to their increasing Curie temperature towards the hot end of said thermal module.

In this configuration, said method can also consist in producing said magnetocaloric elements from several magnetocaloric materials arranged according to a Curie temperature increasing towards the hot end of said thermal module.

In the thermal generator implementing the method according to the invention, said circulating means can include a piston in each compartment, arranged so as to suck in and deliver said defined volume of heat transfer fluid.

In addition, said magnetocaloric elements can be in fluidic communication with each other through two distinct and parallel circuits, respectively a circuit of fluid that is cooling down, called cold circuit, and a circuit of fluid that is heating up, called hot circuit, these circuits being provided with means to control the direction of circulation of the heat transfer fluid, so that the circulation of the heat transfer fluid in said circuits takes place in opposite directions.

BRIEF DESCRIPTION OF THE DRAWINGS

The present invention and its advantages will be better revealed in the following description of an embodiment given as a non limiting example, in reference to the drawings in appendix, in which.

DETAILED DESCRIPTION OF THE PREFERRED EMBODIMENTS

In the illustrated embodiment examples, identical parts or pieces have the same numerical references.

The thermal module 1 represented in the attached FIGS. 2 to 7 comprises four magnetocaloric elements 21, 22, 23, 24 defining a cold end 3 on the left side and a hot end 4 on the right side of the figures, these elements being connected with each other two by two, namely between the adjacent magnetocaloric elements 21 and 22, 22 and 23, and 23 and 24. These magnetocaloric elements 21, 22, 23, 24 are connected with each other every time by two distinct fluidic circuits 8 and 9, namely a cold circuit 8 and a hot circuit 9. The magnetocaloric elements 21, 22, 23 and 24 are connected serially in two distinct fluidic circuits 8 and 9 connected in parallel. Each fluidic circuit 8, 9 comprises a piston 61, 62, 63; 71, 72, 73 forming a circulating means for the heat transfer fluid, the chamber of each piston forming a compartment 81, 82, 83, respectively 91, 92, 93 connected fluidically with the corresponding magnetocaloric elements 21, 22, 23, 24. Said compartments 81, 82, 83, 91, 92, 93 create intermediary receiving areas for the heat transfer fluid, said fluid being sucked in them and delivered between two magnetic phases. Furthermore, the circuits 8, 9 also comprise means for controlling the direction of circulation of the heat transfer fluid (see FIGS. 5A and 5B), such as for example nonreturn valves. These heat transfer fluid control means aim to impose the direction of circulation of the heat transfer fluid in circuits 8, 9 and, for example, referring to the figures, from the right to the left for circuit 8, that is to say from hot end 4 towards cold end 3, and from the left to the right for circuit 9, that is to say from cold end 3 towards hot end 4.

The magnetocaloric elements 21, 22, 23 and 24 have Curie temperatures that increase from cold end 3 towards hot end 4, magnetocaloric element 24, having the highest Curie temperature, being located at the hot end 4 of thermal module 1. As a variant, each magnetocaloric element 2 can be made of an assembly of several different magnetocaloric materials, also arranged according to their increasing Curie temperature. These magnetocaloric elements comprise through fluid channels (not represented), which can be made of the pores of a porous material, mini or micro-channels machined in a solid block or made for example of an assembly of superposed grooved plates.

The cold 3 and hot 4 ends of thermal module 1 are merged with the cold and hot ends of the two magnetocaloric elements 21 and 24 located at the ends of said thermal module 1. They are of course also connected to one or several means for circulating the heat transfer fluid, such as pistons or any other equivalent device, not represented in FIGS. 2A to 2C. They can also be coupled with heat exchangers or any equivalent means allowing to diffuse the calories and/or the frigories towards one or several external applications.

The thermal module 1 represented in FIGS. 3, 5A, 5B, 7A and 7B comprises a linear structure in which the four magnetocaloric elements 21, 22, 23 and 24 are aligned. Of course, any other appropriate shape may be suitable.

FIGS. 3, 5A, 5B, 7A and 7B do not show the magnetic arrangement 5 that allows exposing the magnetocaloric elements 21 to 24 to a variable magnetic field. Said magnetic arrangement 5 is however represented schematically on FIGS. 2A to 2C. It can be made of permanent magnets in relative movement with respect to the magnetocaloric elements 21 to 24 or of any other analogous means.

Each magnetocaloric element 21, 22, 23, 24 can be crossed by a heat transfer fluid put in motion by pistons 61, 62, 63; 71, 72, 73 and is exposed to a magnetic field variation due to magnetic arrangement 5 generating alternating heating and cooling phases, a magnetic cycle being made of two magnetic phases that coincide with a cooling phase and a heating phase of the corresponding magnetocaloric element 21, 22, 23, 24. The displacement of pistons 61, 62, 63; 71, 72, 73 is synchronized with the magnetic field variation so that the heat transfer fluid flows towards hot end 4 through each magnetocaloric element 21 and 23 or 22 and 24 undergoing a heating cycle, and towards cold end 3 through each magnetocaloric element 22 and 24 or 21 and 23 undergoing a cooling cycle. This displacement is possible thanks to the two distinct fluidic circuits 8 and 9 connecting each of the magnetocaloric elements 21, 22, 23, 24 serially. A first fluidic circuit 8, called cold circuit, is dedicated to the displacement of the heat transfer fluid, from the right to the left on the figures, passing through magnetocaloric elements 21, 22, 23, 24 only when they undergo a cooling cycle and the second fluidic circuit 9, called hot circuit, is dedicated to the displacement of the heat transfer fluid, from the left to the right on the figures, passing through magnetocaloric elements 21, 22, 23, 24 only when they undergo a heating cycle. The same applies to chambers 81, 82, 83; 91, 92, 93 of which a first part 81, 82, 83 corresponds to the first fluidic circuit 8 and receives only the heat transfer fluid that is cooling down passing through magnetocaloric elements 21, 22, 23, 24 when they undergo a cooling cycle, and whose second part 91, 92, 93 corresponds to the second fluidic circuit 9 and receives only the heat transfer fluid that is heating up passing through magnetocaloric elements 21, 22, 23, 24 when they undergo a heating cycle.

As already stated, control means for the heat transfer fluid are integrated in each circuit 8, 9 in order to impose in them the direction of circulation of the heat transfer fluid. In other words, between two magnetocaloric elements, a circuit 9, called hot circuit, is intended to circulate the heat transfer fluid in one direction and another circuit 8, called cold circuit, is intended to circulate the heat transfer fluid in the opposite direction. There is no change of direction circulation in said circuits 8, 9, each of them being intended to circulate the heat transfer fluid in only one direction, that is to say from one magnetocaloric element towards the magnetocaloric element it is connected to by said circuits 8, 9. Thus, considering the hot 9 and cold 8 circuits connecting the magnetocaloric elements 21 and 22, the hot circuit 9 is intended to transfer the heat transfer fluid flowing out of magnetocaloric element 21 at the end of a heating phase towards magnetocaloric element 22 with a temporary storage in or passage through a receiving area 91 and the cold circuit 8 is intended to transfer the heat transfer fluid flowing out of magnetocaloric element 22 at the end of a cooling phase towards magnetocaloric element 21 with a temporary storage in or passage through a receiving area 81. The hot circuit 9 circulates the heat transfer fluid towards hot end 4 and the cold circuit 8 circulates the heat transfer fluid towards cold end 3. The intermediate receiving areas 81, 91 allow storing the heat transfer fluid between two magnetic phases.

Figure 2A:
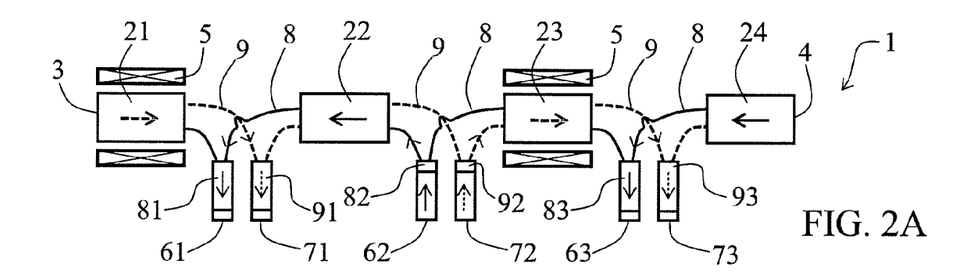
FIGS. 2A to 2C are schematic views of a thermal module made up of four magnetocaloric elements respectively in three successive phases of the method according to the invention and illustrating the displacement of the heat transfer fluid through said elements.
Figure 2B:
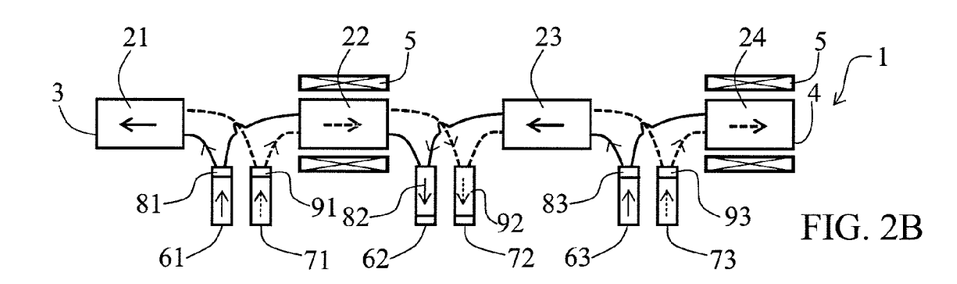
Figure 2C:
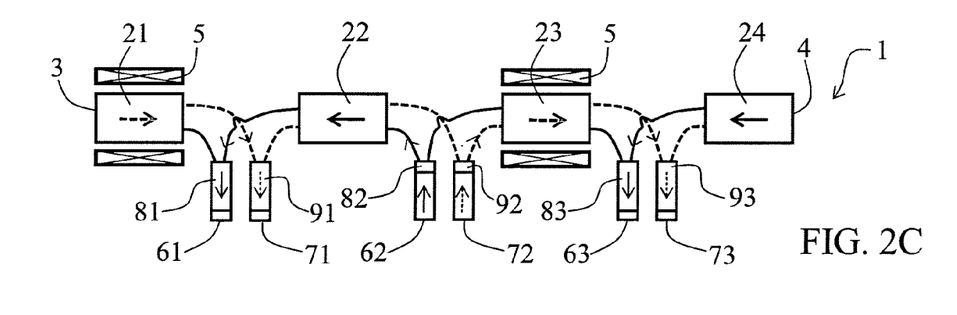
Figure 3:
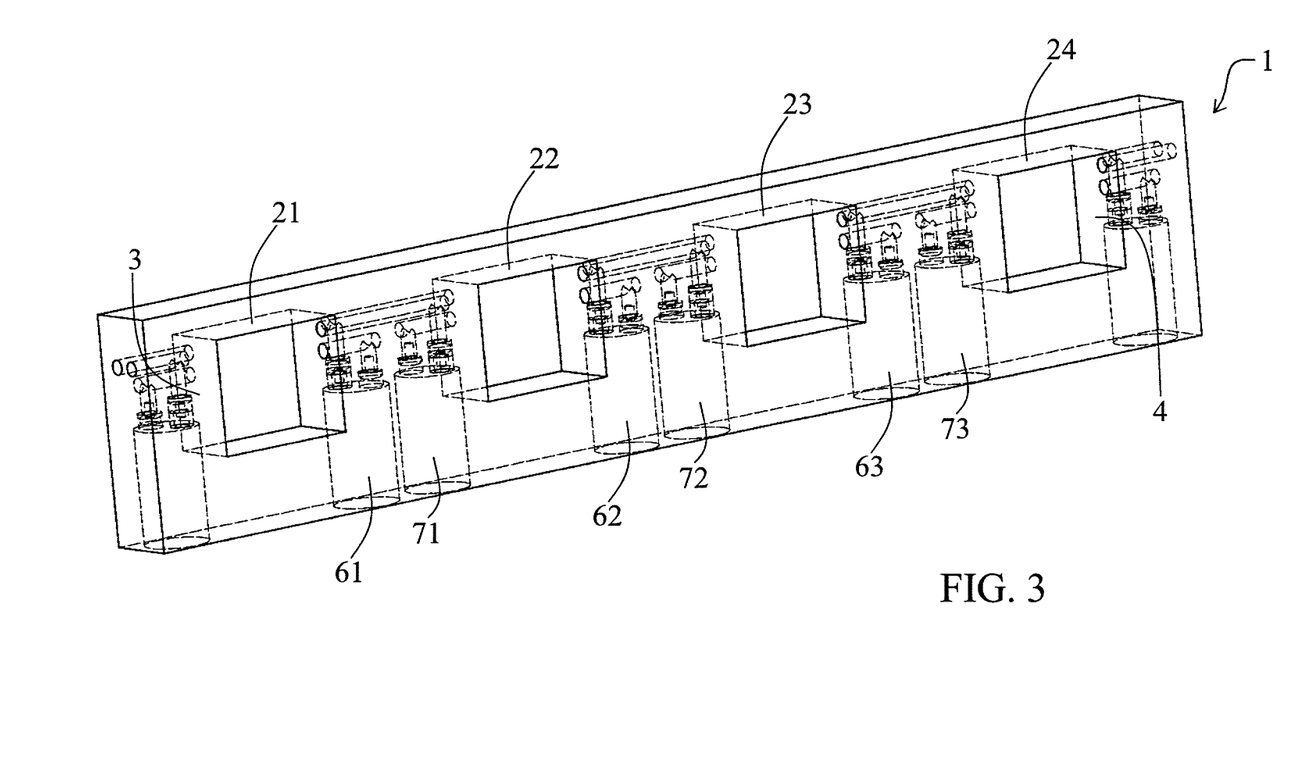
FIG. 3 is a perspective view of an embodiment of a thermal module according to the invention.
Figure 4:
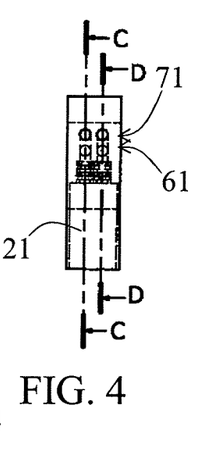
FIG. 4 is a side view of a part of the thermal module of FIG. 3, FIGS. 5A and 5B are cross-sectional views of the thermal module of FIG. 3 respectively according to planes C-C and D-D of FIG. 4, representing the thermal module in a first magnetic phase.

FIGS. 2A to 2C illustrate thermal module 1 in three successive magnetic phases of the method. FIGS. 2A, 2C and 5A and 5B represent the thermal module 1 wherein the magnetocaloric elements 21, 22, 23, 24 are in the same magnetic state, that is to say: the first and the third magnetocaloric elements 21 and 23 from the left on these figures are exposed to a magnetic field or to an increase of the magnetic field generated by magnetic arrangement 5 and are in a heating phase, and the two other magnetocaloric elements 22 and 24 of thermal module 1 are exposed to a magnetic field equal to zero or to a decrease of the magnetic field and are in a cooling phase.

In the case of magnetocaloric materials with reverse magnetocaloric effect, exposing them to a magnetic field or to an increasing magnetic field would result in them cooling down and removing them from this field or exposing them to a low or decreasing magnetic field would result in them heating up. The method according to the invention would thus remain unchanged, only the phases of the cycle would be reversed with respect to the magnetic field variation.

Figure 7A:
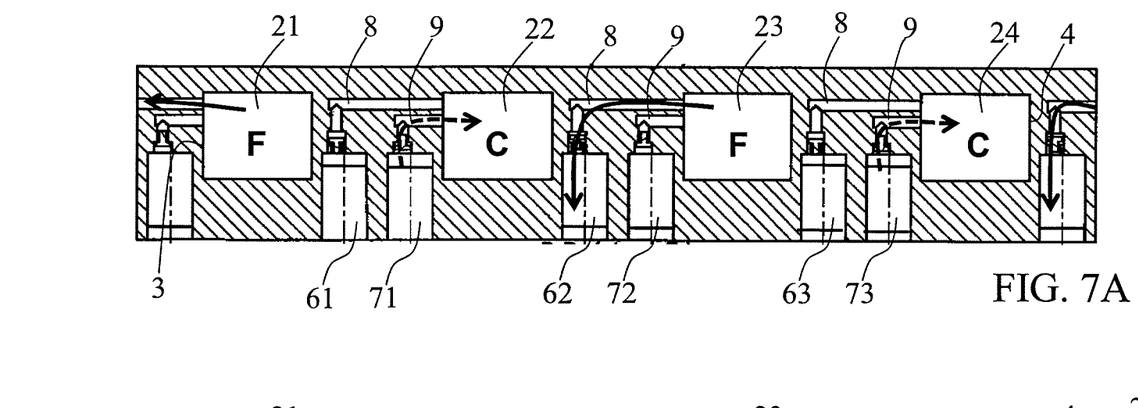
Figure 7B:
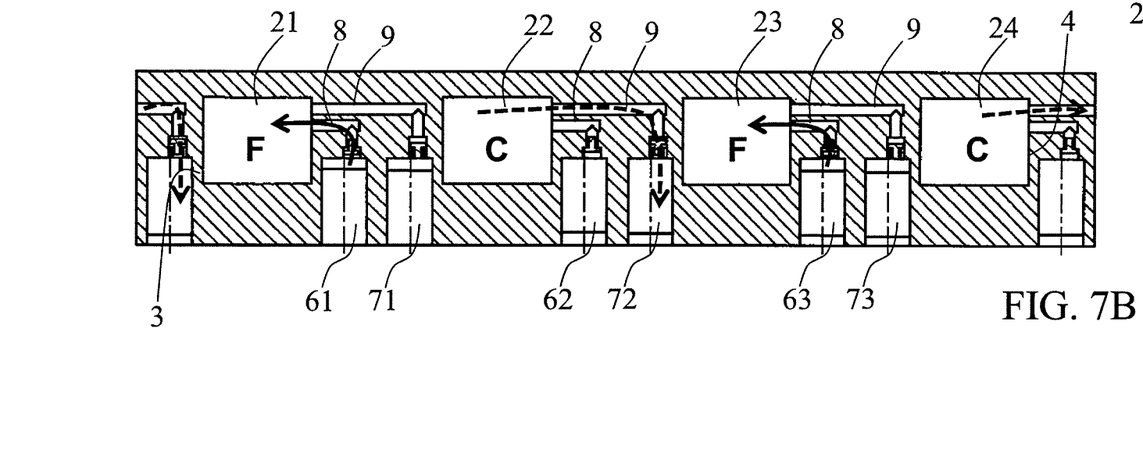

FIGS. 2B, 7A and 7B represent thermal module 1, wherein the first and third magnetocaloric elements 21 and 23 are in a cooling phase, since they are no more exposed to the magnetic field, and the two other magnetocaloric elements 22 and 24 are exposed to a magnetic field generated by magnetic arrangement 5 and in a heating phase. The circulation of the heat transfer fluid is controlled by pistons 61, 62, 63; 71, 72, 73.

Figure 5A:
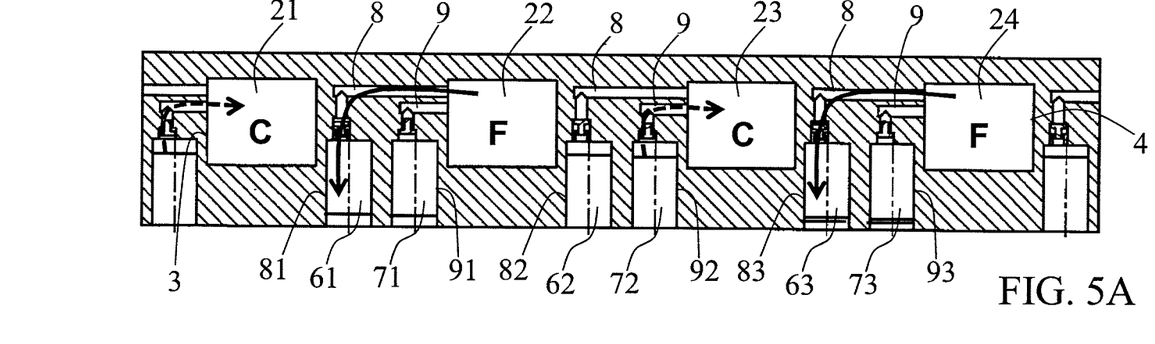
Figure 5B:
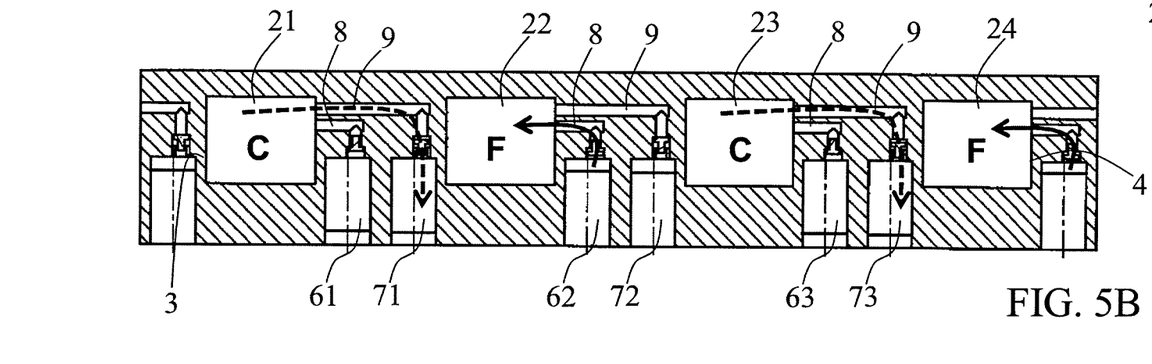
Figure 6:
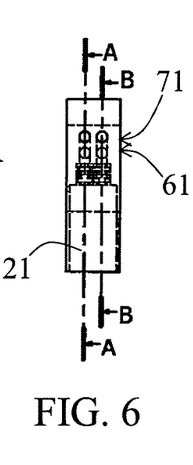
FIG. 6 is a side view of a part of the thermal module of FIG. 3, identical to FIG. 4, and FIGS. 7A and 7B are cross-sectional views of the thermal module of FIG. 3 respectively according to planes A-A and B-B of FIG. 6, representing the thermal module in a second magnetic phase.

FIGS. 2A, 5A and 5B represent the first magnetic phase wherein pistons 61, 71 and 63, 73 located respectively between the first magnetocaloric element 21, which is activated (exposed to a magnetic field or to an increasing magnetic field), and the second magnetocaloric element 22, which is deactivated (not exposed to a magnetic field or exposed to a decreasing magnetic field) and between the third magnetocaloric element 23, which is activated, and the fourth magnetocaloric element 24, which is deactivated, are moved downwards, in suction mode, so that their chamber or compartment 81, 91 and 83, 93 sucks the heat transfer fluid in, and the two other pistons 62 and 72 are moved upwards, in delivery mode, so that their chamber or compartment 82, 92 expulses the heat transfer fluid it contains.

FIGS. 2B, 7A and 7B represent the second magnetic phase wherein pistons 61, 71 and 63, 73 located respectively between the first magnetocaloric element 21, which is now deactivated and the second magnetocaloric element 22, which is activated, and between the third magnetocaloric element 23, which is deactivated, and the fourth magnetocaloric element 24, which is activated, are moved upwards, in delivery mode, so that their chamber or compartment 81, 91 and 83, 93 expulses the heat transfer fluid it contains, and the two other pistons 62 and 72 are moved downwards, in suction mode, so that their chamber or compartment 82, 92 sucks heat transfer fluid in.

FIG. 2C represents the third magnetic phase, which corresponds to the first magnetic phase illustrated in FIG. 2A.

Referring to FIGS. 2A, 2B, 2C, 5A, 5B, 7A et 7B, it can be noted that the heat transfer fluid made to circulate through the first magnetocaloric element 21, which is undergoing heating, and directed towards chamber 91 in the first magnetic phase of FIG. 2A is, during the second magnetic phase of FIG. 2B, made to circulate through the second magnetocaloric element 22, which is also undergoing heating, and directed towards chamber 92, and is then made to circulate through the third magnetocaloric element 23, which is undergoing heating, and directed towards chamber 93 during the third magnetic phase of FIG. 2C. In a similar manner, the heat transfer fluid made to circulate through the fourth magnetocaloric element 24, which is undergoing cooling, and directed towards chamber 83 the first magnetic phase of FIG. 2A is, during the second magnetic phase of FIG. 2B, made to circulate through the third magnetocaloric element 23, which is also undergoing cooling, and directed towards chamber 82, then, during the third magnetic phase of FIG. 2C, is made to circulate through the second magnetocaloric element 22, which is undergoing cooling, and directed towards chamber 81.

So, the heat transfer fluid that circulates from cold end 3 towards hot end 4, from left to right on the figures, heats up as it gets closer to said hot end 4, since it is successively heated by every magnetocaloric element 21 to 24, taking advantage of the heating of each of the latter when it passes through them. Simultaneously, the heat transfer fluid that circulates from hot end 4 towards cold end 3, from right to left on the figures, cools down as it gets closer to said cold end 3 since it is successively cooled by every magnetocaloric element 24 to 21 taking advantage of the cooling of the latter when it passes through them. In addition, the cold 8 and hot 9 fluidic circuits are dissociated, so that the volume of heat transfer fluid circulating through the magnetocaloric elements when they are heating up never gets mixed with the volume of heat transfer fluid circulating through the same magnetocaloric elements 21 to 24 when they are cooling down. Such a configuration with in particular the magnetocaloric elements 21 to 24 arranged according to their increasing Curie temperature and such a method allow increasing the temperature gradient between the hot and cold ends of thermal module 1, and reaching it quickly. In other words, the invention allows obtaining quickly a high temperature gradient and thus a high useful thermal output liable to be extracted from such a heat module 1.

The method according to the invention allows creating a temperature gradient between the hot 4 and cold 3 ends of a thermal module 1 and maintaining this gradient in case of thermal energy extraction or exchange with an external application or circuit. The thermal generator according to the invention is actually intended for exchanging thermal energy with one or several external user circuits (heating, air conditioning, tempering, etc.), being connected to them at least at one if the cold 3 or hot 4 ends of each thermal module 1, if necessary via a heat exchanger. A hot or cold chamber can also be put in communication or fluidically connected with hot 4 or cold 3 end of thermal module 1.

In addition, putting the heat transfer fluid in motion by sections, that is to say by circulating means between two adjacent magnetocaloric elements, has many advantages with respect to the known generators, wherein the fluid circulates simultaneously through all magnetocaloric elements MC in a first direction, from the first magnetocaloric element to the last magnetocaloric element, then through the same magnetocaloric elements MC, but in the direction opposite to the first (see FIGS. 1A and 1B).

A first advantage lies in the fact that the head losses are distributed and reduced, since the heat transfer fluid moved by a piston 61, 62, 63; 71, 72, 73 only passes through one magnetocaloric element 2 at every magnetic phase and not through all magnetocaloric elements 2 making up a thermal module 1.

To that purpose, referring to FIGS. 2A to 2C, the arrows illustrate the direction of displacement of the heat transfer fluid, the dotted arrows corresponding to a displacement towards hot end 4 and the solid arrows illustrating a displacement towards cold end 3.

A second advantage appears when comparing the system known of the prior art represented in FIGS. 1A and 1B with the one according to the invention, wherein one has a same length of magnetocaloric material. It can be noted that, for a same speed of the heat transfer fluid passing through the magnetocaloric elements MC, the frequency of the cycles is multiplied by four in the generator according to the invention comprising a thermal module 1. From this results that the thermal output of such a thermal generator is also increased in the same proportion.

As an illustrative example, for a heat transfer fluid speed of 100 mm/s and a length of 100 millimeters per magnetocaloric element:

the time necessary to pass through all magnetocaloric elements MC of the system known from the prior art represented in FIGS. 1A and 1B is $(4\times100)\div100=4$ seconds, which is equivalent to a frequency of 0.25 hertz, while the time necessary to pass through all magnetocaloric elements 21 to 24 of the thermal generator 1 according to the invention is $(1\times100)\div100=1$ second, which is equivalent to a frequency of 1 hertz, that is to say four times faster.

Also, and still comparing the thermal module 1 according to the invention with the system known from the prior art, one notes that for a same cycles frequency (demagnetization and magnetization), the displacement speed of the heat transfer fluid is divided by four in the thermal generator according to the invention. As a result, in the invention, the head losses are reduced, which is equivalent to a decrease of the energy required for displacing the heat transfer fluid and an increase of the exchange time and thus of the exchanged thermal output.

As an illustrative example, for a frequency of 0.5 hertz corresponding to a heating (or magnetization) phase of one second and to a cooling (or demagnetization) phase of one second and a length of 100 millimeters per magnetocaloric element:

to pass through all magnetocaloric elements MC of the system known from the prior art represented in FIGS. 1A and 1B during one second, the speed of the heat transfer fluid must be $(4\times0.100)\div1=0.4$ m/s, while to pass through all magnetocaloric elements 21, 22, 23, 24 of thermal module 1 according to the invention, the speed of the heat transfer fluid moved in every common chamber is $(1\times0.100)\div1=0.1$ m/s.

The attached figures do not represent the operating means for pistons 81, 82, 83; 71, 72, 73. These operating means can be made of a corresponding drive cam mounted on a shaft rotating on itself, for example, or of any equivalent means.

In such a configuration, it is also possible to arrange several thermal modules 1 in a star, for example shifted with respect to each other according to an angle of 90° and to produce a drive cam comprising corresponding lobes, also shifted with respect to each other by an angle of 90°, said thermal modules being then arranged radially around a shaft so that each lobe actuates a piston of each of said thermal modules 1.

In a second, non represented embodiment, the actuation of pistons 81, 82, 83; 71, 72, 73 can be achieved by means of an operating carriage moving in a reciprocating translation movement along said thermal module 1 and comprising a guide groove wherein corresponding connecting elements of each piston are guided. The guide groove can have a sawtooth shape and the pistons can be arranged approximately in front of the operating carriage.

Advantageously, the method consists in circulating the heat transfer fluid through all of the magnetocaloric elements 21 to 24 so as to set up quickly a high temperature gradient between the two cold 3 and hot 4 ends of magnetocaloric element 1. In this method, a first part of the heat transfer fluid circulates towards cold end 3 and passes through the magnetocaloric elements 24 to 21 only when they are in a cooling phase and a second part of the heat transfer fluid circulates in a simultaneous manner towards hot end 4 and passes through the magnetocaloric elements 21 to 24 only when they are in a heating phase. Therefore, the fluid circulating in cold circuit 8 cools down as it gets closer to cold end 3 and passes through magnetocaloric elements 24 to 21 arranged according to their decreasing Curie temperature and exchanges thermally with them, while the fluid circulating in hot circuit 9 heats up as it gets closer to hot end 4 and passes through magnetocaloric elements 21 to 24 arranged according to their increasing Curie temperature and exchanges thermally with them.

Of course, the invention is not restricted to these described embodiments and any kind of device allowing operating pistons 81, 82, 83; 71, 72, 73 may be suitable.

A generator according to the invention may comprise one or several thermal modules 1. The number and spatial arrangement of these thermal modules will depend on the space available and on the required thermal output.

Possibilities for Industrial Application:

This description shows clearly that the invention allows reaching the goals defined, that is to say offer a thermal generator comprising one or several thermal modules 1 with a simple construction and an improved efficiency.

Such a thermal generator can find an application, as well industrial as domestic, in the area of heating, air conditioning, tempering, cooling or others, at competitive costs and with reduced space requirements.

Furthermore, all parts making up this thermal generator can be produced according to reproducible industrial processes.

The present invention is not restricted to the example of embodiment described, but extends to any modification or variant which is obvious to a person skilled in the art while remaining within the scope of the protection defined in the attached claims.

The invention claimed is:

1. A method of generating a thermal flow from at least one thermal module (1) comprising at least first and second magnetocaloric elements (21, 22, 23, 24) through which a heat transfer fluid flows and which are exposed to a variable magnetic field alternately creating, in each magnetocaloric element (21, 22, 23, 24), a different magnetic phase corresponding successively to a heating and a cooling phase, the heat transfer fluid circulating simultaneously through the magnetocaloric elements (21, 22, 23, 24) in a manner synchronized with the variation of the magnetic field, and elements of the at least first and second magnetocaloric elements (21, 22, 23, 24) being exposed alternately to an opposite variation of the magnetic field in order to create simultaneously opposite magnetic phases in each of them, the method further comprising the steps of:

connecting the at least first and second magnetocaloric elements (21, 22, 23, 24), two by two, by two distinct fluidic circuits (8, 9) so that the magnetocaloric elements (21, 22, 23, 24) are serially connected in the fluidic circuits (8, 9), which are themselves connected in parallel, simultaneously circulating the heat transfer fluid in the at least first and second magnetocaloric elements (21, 22, 23, 24), two by two, and in two opposite directions and so that, on the one hand, a volume of fluid flowing out of one of the at least first and second magnetocaloric elements (21, 23; 22) through one (9) of the fluidic circuits at the end of a magnetic heating phase is made to circulate, during a following magnetic phase, in a following one of the magnetocaloric element (22, 24; 23) that is then undergoing a magnetic heating phase and that, on the other hand, a volume of fluid flowing out of one of the at least first and second magnetocaloric elements (22, 24; 23) through the other (8) of the fluidic circuits at the end of a magnetic cooling phase is made to circulate, during the following magnetic phase, in a following magnetocaloric element (21, 23; 22) that is then undergoing a magnetic cooling phase, and vice-versa, and storing, between two magnetically opposite phases, the heat transfer fluid between the at least first and second magnetocaloric elements (21, 22, 23, 24) connected, two by two, in at least one intermediate receiving area (81, 82, 83, 91, 92, 93) provided in the distinct and parallel fluidic circuits (8, 9).

2. The method according to claim 1, further comprising the step of circulating the heat transfer fluid simultaneously towards a first end of the thermal module, referred to as a cold end (3), through each magnetocaloric element (21, 22, 23, 24) undergoing a cooling phase, and towards a second end of the thermal module, referred to as a hot end (4), through each magnetocaloric element (21, 22) 23, 24) undergoing a heating phase.

3. The method according to claim 1, further comprising the step of connecting fluid ically the at least first and second magnetocaloric elements two by two through two distinct circuits (8, 9), respectively a circuit of fluid that is a cooling down, referred to as a cold circuit (8), and a circuit of fluid that is heating up, referred to as a hot circuit (9), and forming the two circuits (8, 9) to each comprise a compartment (81, 82, 83; 91, 92, 93) forming an intermediate receiving area, located between two adjacent magnetocaloric elements and arranged so as to receive the heat transfer fluid flowing out of a magnetocaloric element (21, 22, 23, 24) before reinjecting the heat transfer fluid in the following magnetocaloric element (22; 21, 23; 22, 24; 23).

4. The method according to claim 1, further comprising the steps of selecting the at least first and second magnetocaloric elements (21, 22, 23, 24) to each have a different Curie temperature, and arranging, in the thermal module (1), the at least first and second magnetocaloric elements (21, 22, 23, 24) according to increasing Curie temperature towards a hot end (4) of the thermal module (1).

5. The method according to claim 4, further comprising the step of producing the at least first and second magnetocaloric elements (21, 22, 23, 24) from several magnetocaloric materials.

6. A thermal generator comprising at least one thermal module (1) including at least first and second magnetocaloric elements (21, 22, 23, 24) arranged so that a heat transfer fluid flows through the at least first and second magnetocaloric elements (21, 22, 23, 24), a magnetic arrangement (5) intended for exposing each magnetocaloric element (21, 22, 23, 24) to a variable magnetic field, alternately creating in each magnetocaloric element (21, 22, 23, 24) two successive magnetic phases corresponding to a heating phase and to a cooling phase, circulation of the heat transfer fluid through the magnetocaloric elements (21, 22, 23, 24) being achieved by circulating means (61, 62, 63; 71, 72, 73) synchronized with the variation of the magnetic field, thermal generator, wherein the magnetocaloric elements (21, 22, 23, 24) are in fluidic communication two by two via two distinct fluidic circuits (8, 9), connected themselves in parallel, and comprising each at least one compartment (81, 82, 83; 91, 92, 93) able to receive, during a magnetic phase, a defined volume of heat transfer fluid flowing out of one of the at least first and second magnetocaloric elements (21, 22, 23, 24) and to direct the heat transfer fluid towards a following magnetocaloric element (22; 21, 23; 22, 24; 23) during the following magnetic phase, the method further comprising the steps of:

connecting the at least first and second magnetocaloric elements (21, 22, 23, 24),     simultaneously circulating the heat transfer fluid in the at least first and second magnetocaloric elements (21, 22, 23, 24), two by two, and in two opposite directions and so that, on the one hand, a volume of fluid flowing out of one of the at least first and second magnetocaloric elements (21, 23; 22) through one (9) of the fluidic circuits at the end of a magnetic heating phase is made to circulate, during a following magnetic phase, in a following one of the magnetocaloric element (22, 24; 23) that is then undergoing a magnetic heating phase and that, on the other hand, a volume of fluid flowing out of one of the at least first and second magnetocaloric elements (22, 24; 23) through the other (8) of the fluidic circuits at the end of a magnetic cooling phase is made to circulate, during the following magnetic phase, in a following magnetocaloric element (21, 23; 22) that is then undergoing a magnetic cooling phase, and vice-versa, and     storing, between two magnetically opposite phases, the heat transfer fluid between the at least first and second magnetocaloric elements (21, 22, 23, 24) connected, two by two, in at least one intermediate receiving area (81, 82, 83, 91, 92, 93) provided in the distinct and parallel fluidic circuits (8, 9).

7. The thermal generator according to claim 6, wherein the circulating means (61, 62, 63; 71, 72, 73) includes a piston in each compartment (81, 82, 83; 91, 92, 93) arranged so as to suck in and deliver a defined volume of heat transfer fluid.

8. The thermal generator according to 6, wherein the at least first and second magnetocaloric elements (21, 22, 23, 24) are in fluidic communication with each other through two distinct and parallel circuits (8, 9), respectively a circuit of fluid that is cooling down, referred to as a cold circuit (8), and a circuit of fluid that is heating up, referred to as a hot circuit (9), the cold and the hot circuits are provided with means to control the direction of circulation of the heat transfer fluid so that the circulation of the heat transfer fluid in the circuits (8, 9) flows in opposite directions.

9. A method of generating a thermal flow from at least one thermal module (1) comprising at least first and second magnetocaloric elements (21, 22, 23, 24) and first and second independent fluidic circuits through which heat transfer fluid flows, each of the first and the second magnetocaloric elements being alternately exposed to a variable magnetic field thereby alternately inducing a heating phase and a cooling phase in the first and the second magnetocaloric elements, the heat transfer fluid circulating simultaneously through the first and the second magnetocaloric elements in a manner synchronized with the variation of the magnetic field, the method further comprising the steps of:

connecting each of the first and the second magnetocaloric elements with both of the first and the second fluidic circuits, such that the first and the second fluidic circuits are in parallel with respect to each other and the first and the second magnetocaloric elements are connected in series with respect to each other,     simultaneously circulating the heat transfer fluid within the first and the second fluidic circuits through the first and the second magnetocaloric elements in opposite directions with respect to the first and the second magnetocaloric elements, such that a volume of the heat transfer fluid flows in the first fluidic circuit, out of the first magnetocaloric element at a conclusion of the heating phase thereof, and a volume of the heat transfer fluid flows in the first fluidic circuit, into the second magnetocaloric element at a start of the heating phase thereof, and a volume of the heat transfer fluid flows in the second fluidic circuit, out of the second magnetocaloric element at a conclusion of the cooling phase thereof, and a volume of the heat transfer fluid flows in the second fluidic circuit, into the first magnetocaloric element at a start of the cooling phase thereof; and     storing, between the cooling and the heating phases of the first and the second magnetocaloric elements, a volume of the heat transfer fluid in an intermediate receiving area that is located in the first fluidic circuit between the first and the second magnetocaloric elements, and storing, between the cooling and the heating phases of the first and the second magnetocaloric elements, a volume of the heat transfer fluid in another intermediate receiving area that is located in the second fluidic circuit between the first and the second magnetocaloric elements.

* * * * *